(12) United States Patent
Ohira

(10) Patent No.: US 7,371,435 B2
(45) Date of Patent: *May 13, 2008

(54) METHOD FOR PREPARING GOLF BALL

(75) Inventor: Takashi Ohira, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/508,868

(22) Filed: Aug. 24, 2006

(65) Prior Publication Data

US 2006/0287407 A1 Dec. 21, 2006

Related U.S. Application Data

(63) Continuation of application No. 10/662,385, filed on Sep. 16, 2003, now abandoned.

(30) Foreign Application Priority Data

Sep. 18, 2002 (JP) .............................. 2002-271878

(51) Int. Cl.
*C08F 2/48* (2006.01)
*C08J 7/04* (2006.01)

(52) U.S. Cl. ...................... 427/508; 427/512; 522/85

(58) Field of Classification Search ................ 427/558, 427/508, 512; 522/84, 85
See application file for complete search history.

(56) References Cited

U.S. PATENT DOCUMENTS

| 4,278,578 A | 7/1981 | Carpenter |
| 5,093,038 A | 3/1992 | Durand |
| 5,300,325 A | 4/1994 | Nealon et al. |
| 5,827,134 A * | 10/1998 | Sullivan et al. ............. 473/372 |
| 5,885,273 A * | 3/1999 | Eckhouse et al. ............. 606/9 |
| 6,013,330 A | 1/2000 | Lutz |
| 6,149,983 A * | 11/2000 | Keller ....................... 427/511 |
| 6,165,564 A | 12/2000 | Crast et al. |
| 6,255,382 B1 | 7/2001 | Hamada et al. |
| 6,352,805 B1 | 3/2002 | Taylor et al. |
| 7,048,651 B2 * | 5/2006 | Kennedy et al. ............ 473/378 |
| 2002/0016226 A1 | 2/2002 | Jin et al. |
| 2004/0052970 A1 | 3/2004 | Ohira |

FOREIGN PATENT DOCUMENTS

| JP | 60-141584 A | 7/1985 |
| JP | 64-83274 A | 3/1989 |
| JP | 2-11095 U | 3/1990 |
| JP | 6-1939 A | 1/1994 |
| JP | 8-71177 A | 3/1996 |
| JP | 2000-336125 A | 12/2000 |
| WO | 00/69526 A1 | 11/2000 |
| WO | WO 00/69526 A1 | 11/2000 |

* cited by examiner

*Primary Examiner*—Susan W. Berman
(74) *Attorney, Agent, or Firm*—Sughrue Mion, PLLC

(57) ABSTRACT

A paint composition comprising an aqueous resin having photo-curable functional groups in a molecule, a photoinitiator, and a crosslinker is suitable for use on golf balls since the composition is fully adherent to molded parts of ionomer resins and urethane resins commonly used in golf ball covers, eliminates a need for pre-treatment of the ball surface, and forms a cured coating having a high bond strength to the ball surface. The composition which is photo-curable ensures efficient operation in the golf ball manufacturing process. In a golf ball coated with the paint composition, the coating has abrasion durability.

13 Claims, No Drawings

METHOD FOR PREPARING GOLF BALL

This is a continuation of application Ser. No. 10/662,385 filed Sep. 16, 2003 now abandoned. The entire disclosure of the prior application, application Ser. No. 10/662,385, is hereby incorporated by reference.

TECHNICAL FIELD

This invention relates to a photo-curable paint composition for golf balls which is applicable to the exterior surface of golf balls without a need for pre-treatment of the ball surface and achieves a practically acceptable level of adhesion thereto. It also relates to a golf ball having a coating of the paint composition.

BACKGROUND ART

Prior art UV curable paints are less adherent to ionomer resins and urethane resins commonly used as the cover of golf balls. The cured coatings of such UV curable paints suffer from the problem of poor bond strength to ionomer resins and urethane resins.

Crast et al., U.S. Pat. No. 6,165,564 discloses to add a carbodiimide resin to a UV curable coating as an adhesion improver. There is still left a room for improvement in the adhesion between the coating and the golf ball surface.

With the desire to improve the adhesion of UV curable paint to golf balls, attempts were made to blend in the UV curable paint a component which is expected to achieve an improvement in adhesion, typically an isocyanate compound, but failed to achieve a practically acceptable level of adhesion.

On use of prior art UV curable paints, the substrate surface to be coated must be tailored by any treatment to improve the wetting property of the substrate. This undesirably complicates the coating process.

SUMMARY OF THE INVENTION

An object of the invention is to provide a paint composition for golf balls which is fully adherent to golf ball covers of ionomer resins and urethane resins, without a need for treatment of the substrate surface prior to coating, and is photo-curable to ensure efficient operation in the golf ball manufacturing process. Another object is to provide a golf ball using the paint composition.

It has been found that a paint composition comprising an aqueous resin having photo-curable functional groups in a molecule, a photoinitiator, and a crosslinker is effectively applicable and bondable to the surface of golf ball covers and achieves satisfactory adhesion between the golf ball cover surface and the coating. Since the paint composition is photo-curable, the time required for the coating to cure can be shortened as compared with the heat curing. This makes efficient the coating step of the golf ball manufacturing process. The present invention is predicated on this finding.

According to the invention, there is provided a paint composition for golf balls, comprising an aqueous resin having photo-curable functional groups in a molecule, a photoinitiator, and a crosslinker. The crosslinker is preferably a carbodiimide or ethyleneimine base crosslinker.

Also contemplated herein is a golf ball having a coating of the paint composition on an exterior surface thereof.

DESCRIPTION OF THE PREFERRED EMBODIMENTS

As used herein, the term "aqueous resin" means that a resin can be dissolved or dispersed in water. While the aqueous resins are divided into water-soluble resins and water-dispersible resins depending on the stabilized state of the resin in water, the present invention favors water-dispersible resins.

In terms of particle size, the water-dispersible resins are sub-divided into colloidal dispersion type (particle size approx. 0.005-0.05 µm) and emulsion type (particle size approx. 0.05-0.5 µm). In terms of the dissolution mechanism in water, the water-dispersible resins are sub-divided into anionic, cationic and nonionic types. When included in the composition of the invention, any type of water-dispersible resin can be used without constraints of sub-division.

The aqueous resins may be based on urethane resins, acrylic resins and polyester resins, for example. Urethane resins are preferably selected from the standpoint of adhesion to the substrate surface.

The aqueous resin used herein should have photo-curable functional groups in a resin skeleton. As used herein, photo-curable functional groups denote functional groups capable of inducing crosslinking reaction upon exposure to light while no other particular limitation is imposed thereto. They may be either functional groups capable of initiating reaction upon exposure to light or functional groups capable of reacting with reactive sites generated by the photoinitiator.

Illustrative examples of photo-curable functional groups include (meth)acrylic groups, cinnamoyl groups and azido groups. Inter alia, (meth)acrylic groups are preferred from the standpoint of versatility in resin design.

The aqueous resins can be prepared by introducing water-soluble groups into various base resins. Suitable water-soluble groups to be introduced into base resins include acidic groups such as carboxyl and sulfonate groups, and basic groups such as amino groups. These water-soluble groups form salts with other groups (or atoms) having a salt-forming ability, and thus become stabilized in water.

Preferred water-soluble groups to be introduced into the aqueous resins are carboxyl groups because of the affinity and adhesion of coatings to ionomer resins and urethane resins used in golf ball covers. The preferred group having a salt-forming ability to the carboxyl group is ammonia, though not limited thereto, because it will volatilize upon drying and curing.

The aqueous resins having photo-curable functional groups in a molecule are commercially available, for example, under the trade name of NeoRad NR-440 (Kusumoto Chemicals, Ltd.) and Superflex R-5000 (Dai-ichi Kogyo Seiyaku Co., Ltd.). They may be used alone or in admixture of two or more.

In the paint composition of the invention, any photoinitiator may be included as long as it is a compound capable of inducing crosslinking reaction upon exposure to light. Well-known photoinitiators are useful. Examples include benzophenone derivatives such as 1-hydroxycyclohexyl phenyl ketone, 2,2-dimethoxy-2-phenylacetophenone, phenylacetophenone diethyl ketal, alkoxyacetophenone, benzyl methyl ketal, benzophenone, 3,3-dimethyl-4-methoxybenzophenone, 4,4-dimethoxybenzophenone, and 4,4-diaminobenzophenone; benzyl derivatives such as alkyl benzoylbenzoates, bis(4-dialkylaminophenyl)ketones, benzyl and benzyl methyl ketal; benzoin derivatives such as benzoyl and benzoin butyl methyl ketal; benzoin isopropyl ether, 2-hydroxy-2-methylpropiophenone; thioxanthone derivatives such as 2,4-diethylthioxanthone and 2,4-dichlorothioxanthone; fluorene, 2-methyl-1-[4-(methylthio)phenyl]-2-morpholinopropane, 1,2-benzyl-2-dimethylamino-1-(morpholinophenyl)-butanone; phosphine oxide derivatives such as 1,2,4,6-trimethylbenzoyldiphenylphosphine oxide, bis(2,6-dimethoxybenzoyl)-2,4,4-trimethylpentylphosphine oxide; organic peroxides such as benzoyl peroxide, t-butyl peroxide, and cumene hydroperoxide; and organic azo compounds such as azobiscyanovaleric acid, azobisbutyronitrile, azobis-(2,4-dimethyl)valeronitrile, and azobis-(2-aminopropane)hydrochloride. These photoinitiators may be used alone or in admixture of two or more.

An appropriate amount of the photoinitiator added is usually at least 0.5 part, preferably at least 1.0 part by weight per 100 parts by weight of aqueous resin solids, and the upper limit amount is usually up to 5 parts, preferably up to 2.5 parts by weight. Too much amounts of the photoinitiator can cause yellowing whereas too little amounts of the photoinitiator may result in an under-cured or even uncured state.

The photoinitiators included in the inventive paint compositions are commercially available, for example, under the trade name of Irgacure 184 and Irgacure 2959 (Ciba Specialty Chemicals). Irgracure 184 is most preferred because of minimized yellowing.

The crosslinkers included in the inventive paint compositions include, for example, carbodiimide, ethyleneimine, oxazoline and epoxy base crosslinkers. Of these, carbodiimide and ethyleneimine base crosslinkers are preferred. Suitable carbodiimide base crosslinkers include N,N'-dicyclohexylcarbodiimide and 1-ethyl-3-(3'-dimethylaminopropyl)carbodiimide. Suitable ethyleneimine base crosslinkers include 2,2-bishydroxymethylbutanol-tris(3-(1-aziridinyl) propionate) and diphenylmethane-bis-4,4'-N,N'-diethyleneurea, with 2,2-bishydroxymethylbutanol-tris(3-(1-aziridinyl)propionate) being most preferred.

In the practice of the invention, the crosslinker is commercially available, for example, under the trade name of Carbodilite V-02-L2 (Nisshinbo Industries, Inc.), Chemitite PZ-33 and Chemitite DZ-22F (Nippon Shokubai Co., Ltd.). Inter alia, Carbodilite V-02-L2 and Chemitite PZ-33 are preferred.

In the paint composition of the invention, diluents, leveling agents, antifoamers, thixotropic agents, surface modifiers, colorants, UV screening agents, photostabilizers, fluorescent materials and fluorescent brighteners may be included in addition to the aqueous resin, photoinitiator and crosslinker described above insofar as this does not compromise the objects of the invention.

Any desired method may be used in applying the paint composition of the invention to golf balls. Desirably the paint composition is dissolved or dispersed in a suitable solvent and then applied to golf balls because this method ensures ease of coating operation, uniform coating and uniform coating thickness. The solvent used herein is most preferably water, which may contain other solvents, for example, alcohols such as methanol, ethanol and isopropanol insofar as the objects of the invention are not impaired.

When the paint composition of the invention is applied to golf balls, the composition usually has a viscosity of at least 10 centipoises (cp), preferably at least 20 cp, and the upper limit viscosity is usually up to 50 cp, preferably up to 40 cp. Too high a viscosity may interfere with atomization during the application whereas a composition with too low a viscosity may run down after application. Therefore, the content of the aqueous resin in the paint composition of the invention is adjusted so as to provide a viscosity within the above-defined range. For application, any desired technique such as air gun painting or electrostatic painting may be used. Differently stated, the viscosity of the composition to be applied may also be adjusted to an efflux time of 5 to 22 seconds, preferably 10 to 18 seconds as measured by Ford Dip Cup #4.

By irradiating light, the paint composition of the invention is cured. The light used for curing may be ionizing radiation such as IR radiation, visible light, UV radiation, X-rays, electron beams, α-rays, β-rays and γ-rays. Of these, UV radiation and electron beams are preferred because they are more effective for curing.

No particular limits are imposed on the material of which is made the surface layer of golf balls to be coated with the paint composition of the invention. The paint composition is applicable to any of surface layers of materials based on ionomer resins, urethane resins and hard rubber. The paint composition develops a high degree of adhesion or bond particularly when the surface to be coated is given by layers of ionomer resin or urethane resin-based materials.

Even without any treatment of the golf ball surface prior to coating, the paint composition of the invention is applicable to the ball surface at a practically acceptable level, and the coating as cured develops a high degree of adhesion or bond to the ball surface. However, the pre-treatment of the golf ball surface need not be prohibited. If the pre-treatment of the golf ball surface is desired, any of well-known surface treatment techniques may be used. Suitable surface treatments include surface activation by oxidation or chlorination, and surface roughening by corona discharge treatment, sand blasting or the like.

When golf balls are coated with the paint composition of the invention, the coating preferably has a thickness of 5 to 30 μm. Any known paint may be additionally coated onto the coating of the inventive paint composition.

EXAMPLE

Examples and Comparative Examples are given below for illustrating the invention although the invention is not limited by the Examples.

Examples 1-7 and Comparative Examples 1-2

Paint compositions for golf balls were prepared by mixing components according to the formulation shown in Table 1 wherein amounts are expressed in parts by weight. There were furnished golf balls having a cover made of a cover stock based on a 50/50 Himilan 1605/Himilan 1706 mixture (ionomer resins by Dupont-Mitsui Polychemicals Co., Ltd.). To the cover surface, without any pre-treatment, each paint composition was applied to a thickness of 15 μm. The coating was dried at 55° C. for 5 minutes and irradiated with light from a high-pressure mercury lamp for curing the coating. Light exposure was carried out at a power of 80 W/cm and a distance of 10 cm and over the entire surface by rotating the ball at a conveyor speed of 6 m/min.

Abrasion tests using sand or sand and water were performed on the coated surfaces of the golf balls, with the results shown in Table 1.

TABLE 1

| Components (pbw) | | Example 1 | 2 | 3 | 4 | 5 | 6 | 7 | Comparative Example 1 | 2 |
|---|---|---|---|---|---|---|---|---|---|---|
| Aqueous resin | NeoRad NR-440 | 100 | 100 | | | 100 | 100 | 100 | 100 | |
| | Superflex R-5000 | | | 100 | 100 | | | | | |
| Cross-linker | Carbodilite V-02-L2 | 10 | 10 | 10 | 10 | 5 | | | | |
| | Chemitite PZ-33 | | | | | | 10 | | | |
| | Epocross WS-500 | | | | | | | 10 | | |
| Photo-initiator | Irgacure 184 | 0.8 | 1.2 | 1.5 | 3 | 0.8 | 0.8 | 0.8 | 0.8 | |
| Water | | 30 | 30 | 30 | 30 | 30 | 30 | 30 | 30 | |
| Solvent type UV-curable paint | | | | | | | | | | 100 |
| Evaluation | Applicability | ○ | ○ | ○ | ○ | ○ | ○ | ○ | ○ | X |
| | Sand abrasion test | ⊚ | ⊚ | ⊚ | ⊚ | ⊚ | ⊚ | ○ | X | X |
| | Sand/water abrasion test | ⊚ | ⊚ | ⊚ | ⊚ | ○ | ⊚ | X | X | X |

NeoRad NR-440: aqueous UV/EB-curable aliphatic urethane dispersion, solids 40%, viscosity 90-120 cp (25° C.), urethane acrylic oligomer, Kusumoto Chemicals, Ltd.
Superflex R-5000: aqueous emulsion of urethane having reactive double bonds, solids 40%, Dai-Ichi Kogyo Seiyaku Co., Ltd.
Carbodilite V-02-L2: polycarbodiimide crosslinker, solids 40%, carbodiimide equivalent 601 (relative to resin), Nisshinbo Industries, Inc.
Chemitite PZ-33: ethyleneimine crosslinker, solids at least 99%, Nippon Shokubai Co., Ltd.
Epocross WS-500: oxazoline crosslinker, solids 40%, Nippon Shokubai Co., Ltd.
Irgacure 184: photoinitiator, Ciba Specialty Chemicals
Solvent type UV-curable paint: UV curable clear paint, trade name Dapco Beem No. 900 Clear (Daishin Paint Co., Ltd.) It was diluted with a special fast-drying thinner to a viscosity giving an efflux time of 10 seconds as measured by Ford Dip Cup #4.
Applicability
○: no repellency observed
X: repellency observed
Sand abrasion test
A porcelain ball mill having an internal volume of 4 liters was charged with 15 coated golf balls and 1.5 liters of abrasive (Showa Denko K. K., Shorel Nugget SN, size 5S) and operated for milling at 60 rpm for 2 hours. The surface state of the ball as abraded was visually observed and the balls were rated according to the following criterion.
⊚: no peeling
○: slight peels at lands around dimples
Δ: many peels at lands around dimples
X: peels on the entire surface
Sand/water abrasion test
Coated golf balls were milled as in the sand abrasion test except that 1.5 liters of water was added to the abrasive. Based on the surface state observed, the balls were rated according to the following criterion.
⊚: no peeling
○: slight peels at lands around dimples
X: peels on the entire surface The paint composition for golf balls according to the invention is fully adherent to molded parts of ionomer resins and urethane resins commonly used in golf ball covers, eliminates a need for pre-treatment of the substrate surface prior to coating, and forms a cured coating having a high bond strength to the substrate surface. The composition is photo-curable and ensures efficient operation in the golf ball manufacturing process. In a golf ball coated with the paint composition, the coating is durably abrasion resistant.

Japanese Patent Application No. 2002-271878 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing a golf ball having on its surface a coating formed from a paint composition, the method comprising the steps of:

preparing the paint composition by compounding an aqueous resin having photo-curable functional groups in a molecule, a photoinitiator, and a crosslinker into a solvent comprising water;

coating the paint composition on an exterior surface of the golf ball;

drying the paint composition to vaporize the water; and curing the paint composition by exposure to light, thereby to obtain the coating.

2. The method for preparing a golf ball of claim 1, wherein said aqueous resin comprises a resin selected from the group consisting of urethane resins, acrylic resins and polyester resins.

3. The method for preparing a golf ball of claim 1, wherein said aqueous resin is prepared by introducing water-soluble groups into a base resin.

4. The method for preparing a golf ball of claim 3, wherein said water-soluble groups comprise one or more groups selected from the group consisting of carboxyl groups, sulfonate groups, and amino groups.

5. The method for preparing a golf ball of claim 1, wherein said photo-curable functional groups comprise one or more groups selected from the group consisting of acrylic groups, methacrylic groups, cinnamoyl groups and azido groups.

6. The method for preparing a golf ball of claim 1, wherein said crosslinker comprises a crosslinker selected from the group consisting of a carbodiimide-based crosslinker, an ethyleneimine-based crosslinker, an oxazoline-based crosslinker and an epoxy-based crosslinker.

7. The method for preparing a golf ball of claim 6, wherein the crosslinker comprises a carbodiimide-based crosslinker selected from the group consisting of N,N'-dicyclohexylcarbodiimide and 1-ethyl-3-(3'dimethylaminopropyl)carbodiimide.

8. The method for preparing a golf ball of claim 6, wherein the crosslinker comprises an ethyleneimine-based crosslinker selected from the group consisting of 2,2-bishydroxymethylbutanol-tris(3-(1-aziridinyl)propionate) and diphenylmethane-bis-4,4'-N,N'-diethyleneurea.

9. The method for preparing a golf ball of claim 1, wherein said photoinitiator is added in an amount of at least 0.5 part by weight and up to 5 parts by weight, per 100 parts by weight of aqueous resin solids.

10. The method for preparing a golf ball of claim 1, wherein a surface layer of the golf ball onto which the paint composition is coated comprises a material based on an ionomer resin, a urethane resin, or a hard rubber.

11. The method for preparing a golf ball of claim 1, wherein said paint composition has a viscosity of at least 10 centipoise and up to 50 centipoise when coated onto the exterior surface of the golf ball.

12. The method for preparing a golf ball of claim 1, wherein the light used for curing is UV radiation.

13. The method for preparing a golf ball of claim 1, wherein the paint composition is coated onto the exterior surface of the golf ball without any pre-treatment of the exterior surface.

* * * * *